United States Patent
Batcher

(10) Patent No.: US 7,552,344 B2
(45) Date of Patent: *Jun. 23, 2009

(54) HARDWARE-BASED ENCRYPTION/DECRYPTION EMPLOYING DUAL PORTED KEY STORAGE

(75) Inventor: Kenneth W. Batcher, Hudson, OH (US)

(73) Assignee: Cisco Technology, Inc., San Jose, CA (US)

( * ) Notice: Subject to any disclaimer, the term of this patent is extended or adjusted under 35 U.S.C. 154(b) by 255 days.

This patent is subject to a terminal disclaimer.

(21) Appl. No.: 11/362,623

(22) Filed: Feb. 27, 2006

(65) Prior Publication Data

US 2006/0140408 A1   Jun. 29, 2006

Related U.S. Application Data

(63) Continuation of application No. 09/675,069, filed on Sep. 28, 2000, now Pat. No. 7,006,634.

(51) Int. Cl.
H04L 9/00 (2006.01)
(52) U.S. Cl. .................. 713/189; 380/259; 380/260
(58) Field of Classification Search ................. 713/189; 380/259, 260
See application file for complete search history.

(56) References Cited

U.S. PATENT DOCUMENTS 6,295,606 B1 *   9/2001   Messerges et al. .......... 713/189

* cited by examiner

Primary Examiner—Jacob Lipman
(74) Attorney, Agent, or Firm—Tucker Ellis & West LLP

(57) ABSTRACT

A system for the encryption and decryption of data employing dual ported RAM for key storage to accelerate data processing operations. The on-chip key storage includes a dual-ported memory device which allows keys to be loaded into memory simultaneous with keys being read out of memory. Thus, an encryption or decryption algorithm can proceed while keys are being loaded into memory.

18 Claims, 4 Drawing Sheets

HARDWARE-BASED ENCRYPTION/DECRYPTION EMPLOYING DUAL PORTED KEY STORAGE

CROSS-REFERENCE TO RELATED APPLICATIONS

This application is a Continuation of U.S. application Ser. No. 09/675,069, filed on Sep. 28, 2000, now U.S. Pat. No. 7,006,634.

FIELD OF THE INVENTION

The present invention generally relates to a system for encryption and decryption of data, and more particularly to a hardware-based encryption and decryption system employing dual ported memory for key storage.

BACKGROUND OF THE INVENTION

In a typical wireless LAN configuration, A common model for network processing consists of a multi-level approach. This is common in many Ethernet LAN protocols such as IEEE 802.3. The model typically includes 3 major levels, namely a) Top: Logical-Link control; b) Middle: Medium Access Control (MAC); and c) Bottom: Physical interface (PHY).

A wireless LAN configuration compliant to IEEE 802.11 is similar to its wired counterpart and has the same three levels. Traditionally, the top Logical-Link control tasks are handled by software running on a HOST processor. The middle level is the responsibility of a MAC processor, which handles all frame traffic between the HOST and the PHY level.

In a typical wireless local area network (WLAN) configuration, a portable or mobile device (e.g., a laptop personal computer) normally includes a HOST processor and a PCI card or PCMCIA card. On this card resides a Medium Access Control (MAC) processing system, a PHY (physical layer) processing device (e.g., a digital signal processor), and a main memory. The MAC processing system includes a MAC processor (e.g., an embedded processor), which is a multi-functional processor engine responsible for a variety of different processing tasks associated with the wireless communications. The PHY processing device performs such functions as encoding/decoding waveforms. Data transferred between the PHY processing device and the MAC processing system (i.e., the PHY data stream) may be encrypted using an encryption algorithm, such as RC4. Consequently, encrypted data received by the MAC processing system from the PHY processing device is initially stored to the main memory as encrypted data. At a later time, the MAC processor reads the stored encrypted data from main memory and decrypts the data. The decrypted data is then written to the main memory for subsequent processing by the HOST processor.

Similarly, in the case of a data transmission from the MAC processor to the PHY data processing device, the data originates from the HOST processor that writes the data as plaintext to the main memory. The MAC processor will at a later time read the data from the main memory and encrypt it, using the same RC4 algorithm. Then the encrypted data is transmitted to the PHY processing device.

Encryption algorithm RC4 (developed by RSA Data Security, Inc.) is used to encrypt data in accordance with Wired Equivalent Privacy for the IEEE wireless communications standard 802.11. RC4 is a variable key-size stream cipher with byte-oriented operations. The algorithm is based on the use of a random permutation. Analysis shows that the period of the cipher is overwhelmingly likely to be greater than $10^{100}$. Eight to sixteen machine operations are required per output byte, and the cipher can be expected to run very quickly in software. RC4 is commonly used for file encryption and for secure communications, as in the encryption of traffic to and from secure web sites using the secured socket layer (SSL) protocol.

In the prior art, both software and hardware approaches have been used to implement the private key RC4 algorithm. In the case where all operations are performed in software, a simple C program can be used, such as those illustrated herein. The RC4 algorithm can be divided into three basic phases: phase 1 for lookup and loading of a private key; phase 2 having two parts, namely, phase 2a for filling an S-box table linearly and phase 2b for initializing the S-box table with the private key; and phase 3 for the encrypting/decrypting operation (including determination of an X byte and an XOR operation).

It should be understood that Phase 2 of the algorithm includes the two steps of: (phase 2a) filling an S-box table (256×8) linearly: $S_0=0, S_1=1, \ldots, S_{255}=255$; and then (phase 2b) initializing the S-box table by scrambling the table with the private key, repeating the key as necessary to address all 256 locations in the array. For example, if a 16 byte key is used, the sequence would be: $KEY_0, KEY_1, \ldots, KEY_{15}, KEY_0, KEY_1, \ldots, KEY_{15}$ repeating this sequence a total of 16 times to complete the scrambling. It should be appreciated that the term "key" refers to a plurality of "key values." In accordance with a preferred embodiment, each key value is a byte, and a key is comprised of 16 key values (i.e., 16 bytes). 16 bytes are required for 128-bit encryption. The key is a private key known only to the transmitter and receiver(s) of the encrypted data.

As indicated above, in Phase 2b of the RC4 algorithm the S-box table is initialized with the private key. In this regard, index j is set to zero, then:

For i=0 to 255:

$j=(j+S_i+KEY_i) \bmod 256$ swap $S_i$ and $S_j$

In the third phase (phase 3), two counters, i and j, are initialized to zero to index through the 256×8 S-box in a pseudorandom fashion. Thereafter, random bytes X are generated as follows:

$i=(i+1) \bmod 256$ $j=(j+S_i) \bmod 256$ Swap $S_i$ and $S_j$ $t=(S_i+S_j) \bmod 256$ $X=S_t$ The foregoing code sequence is performed for every byte to be encrypted/decrypted. Being a symmetric cryptosystem, the same algorithm is used to decrypt or encrypt data depending on how the XOR data is used. In this regard, the byte X is XORed with plaintext to produce ciphertext or XORed with ciphertext to produce plaintext.

Although the software implementation of the foregoing encryption algorithm appears simple in high level code, the software approach is slow. The software approach is too slow to meet the tight turn around time requirements of IEEE 802.11.

In view of the deficiencies of the software implementation, hardware modifications to the MAC processor have been used to accelerate operation of the algorithm. Referring now to FIG. 2, there is shown a MAC processor 10 according to the prior art. MAC processor 10 is generally comprised of a CPU 20, a key register 30, data path hardware engine 40, microcode controller system 50 (which includes a microcode controller and RAM), and S-Box RAM 100.

CPU 20 is the main processing device of MAC processor 10, and provides signals for controlling operation of key register 30 and microcode controller system 50. Keys are commonly stored in "off-chip" RAM since they are large (often 128 bits or more), and there are many keys that might be used to decrypt and encrypt data depending on the source and destination of the packet address. Therefore, in the prior art a small on-chip key register 30 is used to hold the current key bytes being used. Key register 30 is loaded by using register decodes under the direction of software. Therefore, once the proper key is found, software can load the key and start phase 2 of the encryption algorithm discussed above. Data path hardware engine 40 provides an 8-bit wide data path for performing data manipulation for the RC4 algorithm. Data path hardware engine 40 includes elements such as registers, adders, multiplexers, etc., used to read key register 30 and read/write the S-box table RAM 100. Microcode controller system 50 is used to control the data path to execute the operations needed to execute the RC4 algorithm. S-box table RAM 100 is an "on-chip" RAM (i.e., RAM located on the MAC processor chip) which stores the S-box table. The use of an "on-chip" RAM allows for faster initialization and XOR byte generation than obtained with off-chip memory access.

By using the above-mentioned hardware, the prior art takes a total of 1280 (R/W) microcode operations in order to perform the initialization of the S-box table. In addition, the prior art requires that key loading is totally complete before starting the phase 2b initialization operation. However, phase 2a can be executed at any time since the linear fill of the S-box table does not depend on the key. It should be understood that phase 2a must complete before launching phase 2b.

The present invention provides enhancements to the hardware arrangement in order to further improve the speed of the encryption/decryption operations.

SUMMARY OF THE INVENTION

According to a first aspect of the present invention there is provided a method for executing an algorithm for decrypting data, comprising: loading into a memory in consecutive order a plurality of keys respectively associated with a plurality of data frames including encrypted data, wherein each said key is comprised of a plurality of key values; and executing a decryption algorithm simultaneous with loading of key values into the memory, wherein said decryption operation uses key values loaded into memory to decrypt said plurality of data frames.

According to another aspect of the present invention there is provided a method for executing an algorithm for encrypting data, comprising: loading into a memory in consecutive order a plurality of keys respectively associated with a plurality of data frames including unencrypted data, wherein each said key is comprised of a plurality of key values; and executing an encryption algorithm simultaneous with loading of key values into the memory, wherein said decryption operation uses key values loaded into memory to decrypt said plurality of data frames.

According to another aspect of the present invention there is provided a method for executing an algorithm for decrypting data, comprising: loading into a memory in consecutive order a plurality of keys respectively associated with a plurality of data frames including encrypted data, wherein each said key is comprised of a plurality of key values; initializing a table for decryption with at least one of the plurality of key values associated with a first data frame of the plurality of data frames, wherein said initializing step occurs prior to loading of all of the plurality of key values associated with the first data frame, and simultaneous with loading of key values; and executing an algorithm to decrypt the first data frame using the initialized table, said execution occurring simultaneous with loading of key values associated with subsequent data frames of the plurality of data frames.

According to another aspect of the present invention there is provided a method for executing an algorithm for decrypting data, comprising: loading into a memory in consecutive order a plurality of keys respectively associated with a plurality of data frames including encrypted data, wherein each said key is comprised of a plurality of key values; initializing a table for decryption with at least one of the plurality of key values associated with a first data frame of the plurality of data frames, wherein said initializing step occurs prior to loading of all of the plurality of key values associated with the first data frame, and simultaneous with loading of key values; and executing an algorithm to decrypt the first data frame using the initialized table, said execution occurring simultaneous with loading of key values associated with subsequent data frames of the plurality of data frames.

According to another aspect of the present invention there is provided a method for executing an algorithm for encrypting data, comprising: loading into a memory in consecutive order a plurality of keys respectively associated with a plurality of data frames including unencrypted data, wherein each said key is comprised of a plurality of key values; initializing a table for encryption with at least one of the plurality of key values associated with a first data frame of the plurality of data frames, wherein said initializing step occurs prior to loading of all of the plurality of key values associated with the first data frame, and simultaneous with loading of key values; and executing an algorithm to encrypt the first data frame using the initialized table, said execution occurring simultaneous with loading of key values associated with subsequent data frames of the plurality of data frames.

According to another aspect of the present invention there is provided a system for decrypting data, comprising: means for storing in consecutive order a plurality of keys respectively associated with a plurality of data frames including encrypted data, wherein each said key is comprised of a plurality of key values; and means for executing a decryption algorithm simultaneous with storing of key values into the means for storing, wherein said decryption operation uses key values loaded into the means for storing to decrypt said plurality of data frames.

According to another aspect of the present invention there is provided a system for encrypting data, comprising: means for storing in consecutive order a plurality of keys respectively associated with a plurality of data frames including unencrypted data, wherein each said key is comprised of a plurality of key values; and means for executing an encryption algorithm simultaneous with storing of key values into the means for storing, wherein said decryption operation uses key values loaded into the means for storing to decrypt said plurality of data frames.

According to another aspect of the present invention there is provided a system for executing an algorithm for decrypting data, comprising: means for storing in consecutive order a plurality of keys respectively associated with a plurality of data frames including encrypted data, wherein each said key is comprised of a plurality of key values; means for initializing a table for decryption with at least one of the plurality of key values associated with a first data frame of the plurality of data frames, wherein said means for initializing commences initialization of the table prior to loading of all of the plurality of key values associated with the first data frame, and simultaneous with loading of key values; and means for executing an algorithm to decrypt the first data frame using the initialized table, wherein said means for executing decrypts the first data frame simultaneous with storing of key values associated with subsequent data frames of the plurality of data frames.

According to another aspect of the present invention there is provided a system for executing an algorithm for encrypting data, comprising: means for storing in consecutive order a plurality of keys respectively associated with a plurality of data frames including unencrypted data, wherein each said key is comprised of a plurality of key values; means for initializing a table for encryption with at least one of the plurality of key values associated with a first data frame of the plurality of data frames, wherein said initialization occurs prior to loading of all of the plurality of key values associated with the first data frame, and simultaneous with storing of key values; and means for executing an algorithm to encrypt the first data frame using the initialized table, wherein said means for execution executes the algorithm simultaneously with storing of key values associated with subsequent data frames of the plurality of data frames.

According to another aspect of the present invention there is provided a system for decrypting data, comprising: a dual port memory for storing in consecutive order a plurality of keys respectively associated with a plurality of data frames including encrypted data, wherein each said key is comprised of a plurality of key values; and a controller for executing a decryption algorithm simultaneous with storing of key values into the dual port memory, wherein said decryption operation uses key values loaded into the dual port memory to decrypt said plurality of data frames.

According to another aspect of the present invention there is provided a system for encrypting data, comprising: a dual port memory for storing in consecutive order a plurality of keys respectively associated with a plurality of data frames including encrypted data, wherein each said key is comprised of a plurality of key values; and a controller for executing an encryption algorithm simultaneous with storing of key values into the dual port memory, wherein said encryption operation uses key values loaded into the dual port memory to encrypt said plurality of data frames.

According to another aspect the present invention there is provided a system for executing an algorithm for decrypting data, comprising: a dual port memory for storing in consecutive order a plurality of keys respectively associated with a plurality of data frames including encrypted data, wherein each said key is comprised of a plurality of key values; and a controller for: (a) initializing a table for decryption with at least one of the plurality of key values associated with a first data frame of the plurality of data frames, wherein said controller commences initialization of the table prior to loading of all of the plurality of key values associated with the first data frame, and simultaneous with loading of key values, and (b) executing an algorithm to decrypt the first data frame using the initialized table, wherein said controller decrypts the first data frame simultaneous with storing of key values associated with subsequent data frames of the plurality of data frames.

An advantage of the present invention is the provision of a system for encryption/decryption that provides faster lookup of an encryption/decryption private key.

Another advantage of the present invention is the provision of a system for encryption/decryption that provides faster loading of an encryption/decryption private key.

Still another advantage of the present invention is the provision of a system for encryption/decryption that provides faster and more efficient execution of an encryption/decryption algorithm.

Yet another advantage of the present invention is the provision of a system for encryption/decryption that provides greater ease of operation.

Still other advantages of the invention will become apparent to those skilled in the art upon a reading and understanding of the following detailed description, accompanying drawings and appended claims.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein.

DETAILED DESCRIPTION OF THE PREFERRED EMBODIMENT

It should be understood that while a preferred embodiment of the present invention is described in connection with the RC4 encryption/decryption algorithm, the present invention is also suitably applicable to provide improved processing speed and efficiency for other encryption/decryption algorithms that use keys. Moreover, it is contemplated that the present invention has applications outside of data encryption/decryption, as a means for accelerating data processing operations.

Figure 1:
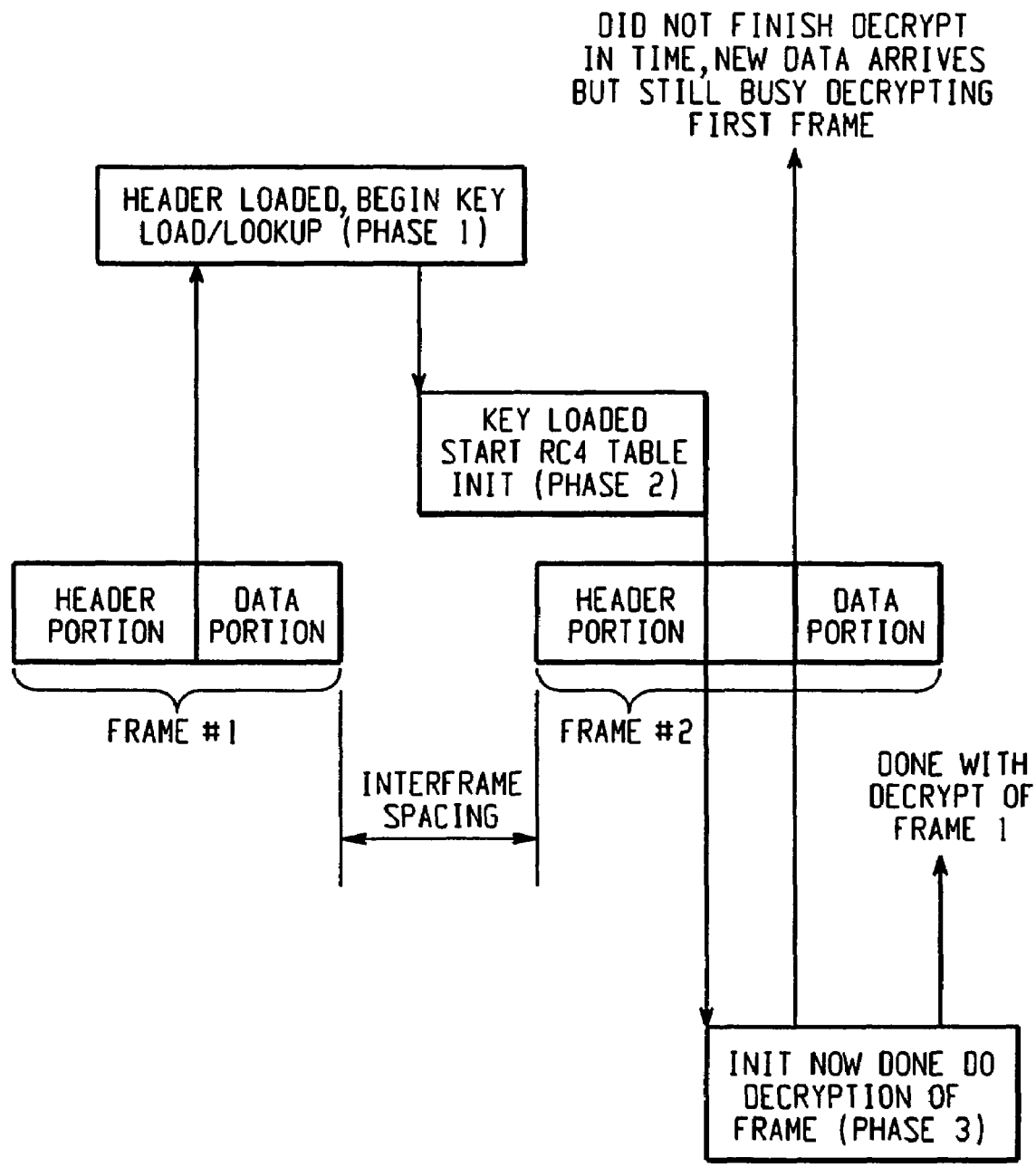
FIG. 1 illustrates a typical PHY data stream.

Referring now to the drawings wherein the showings are for the purposes of illustrating a preferred embodiment of the invention only and not for purposes of limiting same, FIG. 1 illustrates a typical PHY data stream. The PHY data stream include data frames having two main components, namely, a header portion, and a data portion. The header portion includes control information such as source, destination address; data rate, etc. The MAC processor processes the header information so it knows how to deal with the data portion. Furthermore, some information in the header portion may direct the MAC processor to perform actions such as generating a response message to the sender or steering the data to another station. The header portion is not typically encrypted. The data portion typically includes data that is encrypted, and is intended for processing by the HOST processor. This data may be used by the HOST processor to communicate with other HOST processors across a network using some upper level protocol, such as sending an FTP from one station to another station. In the case of a system complying with IEEE standard 802.11, the HOST processor does not use the header information.

Figure 2:
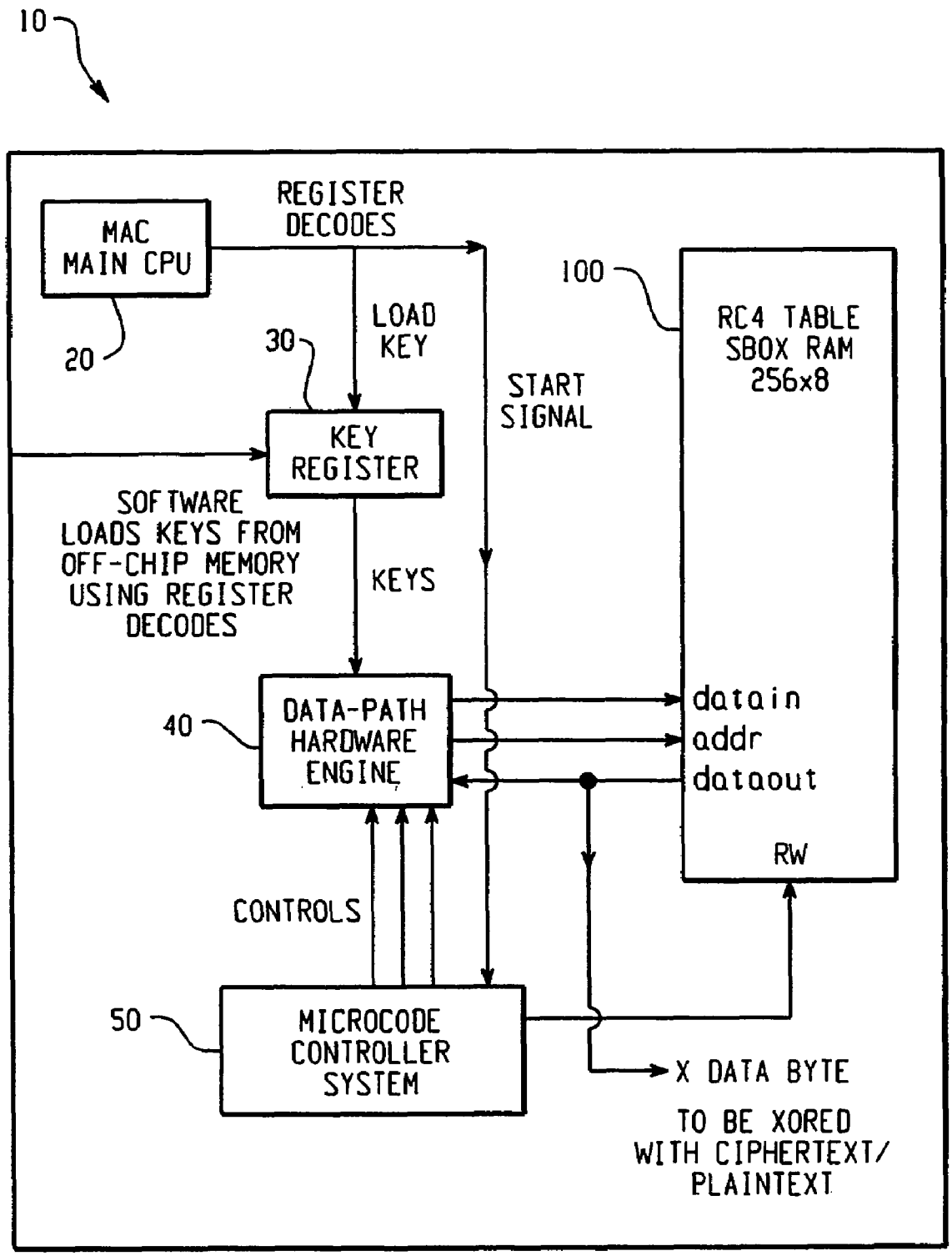
FIG. 2 is a block diagram of a typical prior art hardware configuration for performing encryption/decryption.

The data processing steps for decryption using prior art systems will now be described in detail with reference to FIGS. 1 and 2. As can be seen in FIG. 1, each frame of data is comprised of a header portion and a data portion. A short time gap (i.e., interframe spacing) is provided between each frame. After the header portion of the first data frame (frame #1) has been loaded, phase 1 of the RC4 algorithm commences. The address portion of the header is used to begin the key lookup. After the proper key is found, it is loaded into the key register. While this is happening, encrypted data continues to arrive from the PHY processing device After the key (i.e., the plurality of key values) is entirely loaded into the key register, phase 2 of the RC4 algorithm commences. Phase 2 continues until a period of time after the header for the next data frame (frame #2) has begun to be received. However, most of the time for phase 2 occurs during the interframe spacing. Phase 3 (decrypting/encrypting operation for frame #1) will commence while the header for the next data frame (frame #2) is still being received by the MAC processor. However, as shown, due to the tight turn around time; decryption of all data of frame #1 is not completed before the data portion of frame #2 is received. This is due to the long period of time needed to complete phases 1 and 2 using the prior art system as shown in FIG. 2. It should be understood that a different key may be used for each received data frame since the MAC processor may be receiving data from different clients, each having a unique private key.

As indicated above, the IEEE wireless communication standard 802.11 requires the use of RC4 to encrypt and decrypt frames that are delivered across a wireless LAN. This creates the potential for performance problems since the inter frame spacing timing (SIFs) between data packets is tight as shown in FIG. 1. The decryption of a frame must complete before a subsequent frame arrives so that the next frame can be decrypted. As described above, the RC4 algorithm uses a multiple step process to prepare an S-box table. This process includes finding and loading a private key, and then scrambling the S-box table to initialize it with the private key. The key loading process cannot begin until the header portion of a frame has been processed. Consequently, there is little time to decrypt the data portion of the frame before the next frame arrives. The problem is more pronounced on short frames since there is little time to "amortize the cost" of loading the key and initializing the S-box table with the key, over the packet size.

Figure 3:
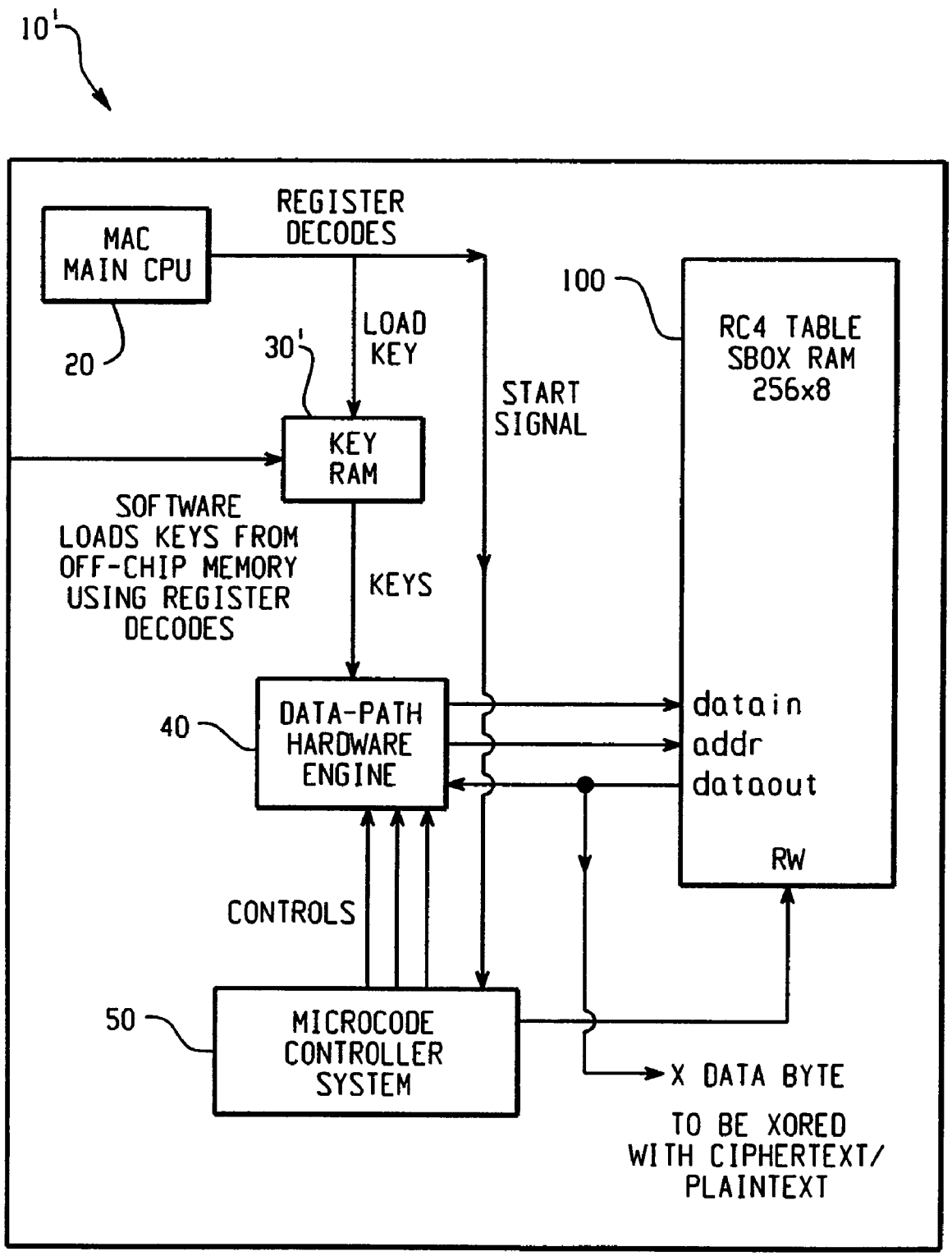
FIG. 3 is a block diagram of a hardware configuration for performing encryption/decryption according to a preferred embodiment of the present invention.

Referring now to FIG. 3, there is shown a modified MAC processor 10', according to a preferred embodiment of the present invention. The present invention reduces the amount of time necessary to complete phase 1 (key lookup and load) of the RC4 algorithm. In this regard, the efficiency of Phase 1 is improved by using a key RAM 30' to house the key storage. Key RAM 30' is a dual ported memory which allows a key to be loaded into memory (write port) (phase 1), while simultaneously reading a key (read port) to initialize the S-box table with the keys (phase 2). Consequently, this allows software to start the phase 2 S-box table initialization sequence prior to loading the entire key (i.e., all key values) into memory. Moreover, key RAM 30' is preferably large enough to hold multiple keys (i.e., keys for consecutive data frames). As a result, the key for frame #2 can be loaded into memory, while simultaneously reading out the key for frame #1, without conflict. Thus, overlapping reading and writing is possible which reduces the key load/delay overhead of frame #2, as illustrated in FIG. 1. In this regard, it is not necessary to wait for decryption of frame #1 to be completed before starting to load the key for frame #2 into memory. Key lookup is also improved since it may be possible to predict a forthcoming reception and have the key preloaded as just described. This removes the need to lookup the proper key when the next frame arrives.

It should be appreciated that key RAM 30' may take the form of a dual port synchronous memory (clocked), dual port asynchronous memory (non-clocked), or dual port synchronous burst or non-burst memory.

In accordance with a preferred embodiment of the present invention, phases 2 and 3 of the RC4 algorithm use the same microcoded data path hardware engine 40 as the prior art. Data path hardware engine 40 performs the read/write (R/W) operations to the S-box table RAM 100 to prepare the S-box table.

Figure 4:
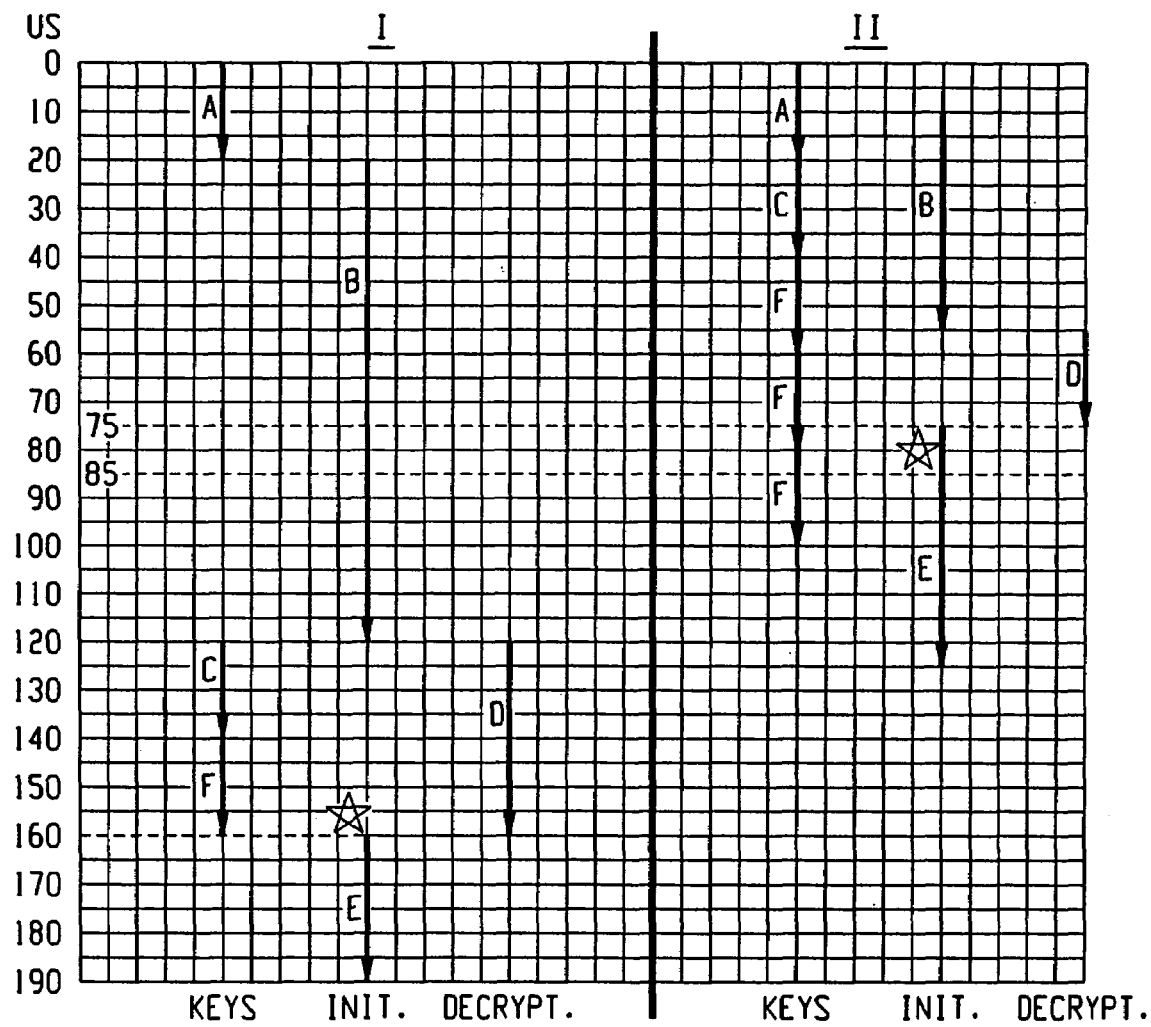
FIG. 4 shows timelines illustrating improvements in processing speed over the prior art.

FIG. 4 provides timelines for a decryption operation that illustrates performance improvements contributed by the present invention. Section I is a timeline associated with the prior art, while Section II is a time line associated with the present invention. It should be appreciated that Section II also illustrates the effects provided by use of level sensitive latches in microcode controller system 50 during microcode fetch and execute, as disclosed in related application Ser. No. 09/670,892, filed Sep. 28, 2000, and assigned to the assignee of the present application.

Six basic steps are performed, namely A-F during two back-to-back decryption phases, as illustrated in FIG. 1. Steps A-F correspond to the tasks noted in the table below:

| STEP | TASK |
| --- | --- |
| A | Lookup and load key for frame #1. May also start phase 2a of frame #1 at this step. (phase 1/2a). |
| B | Initialize S-box table for frame #1. May also do phase 2a of frame #1 at this step. (phase 2a/2b). |
| C | Lookup and load key for frame #2. May also start phase 2a of frame #2 at this step. (phase 1/2a) |
| D | Perform decryption for frame #1 (phase 3) |
| E | Initialize S-box table for frame #2. May also do phase 2a of frame #2 at this step. (phase 2a/2b) |
| F | Lookup and load key for frame #3. May also start phase 2a of frame #3 at this step. (phase 1) |

The three columns in Sections I and II respectively show the resource utilization for loading keys (phase 1), initialization of the S-box table (phase 2) and decryption (phase 3). As can be seen, the prior art takes 160 μs to finish with the first decryption (frame #1) and start the next decryption (frame #2). The present invention contributes to completion of the same tasks in 75 μs. In this regard, as indicated above, dual-ported key RAM 30' allows a key to be loaded into memory (write port) (phase 1), while simultaneously reading a key (read port) to initialize the S-box table with the keys (phase 2). Thus, the phase 2 S-box table initialization sequence can be started prior to loading the entire key (i.e., all key values) into memory. Moreover, key RAM 30' is preferably large enough to hold multiple keys (i.e., keys for consecutive data frames). As a result, the key for frame #2 can be loaded into memory, while simultaneously reading out the key for frame #1, without conflict.

It can be observed from FIG. 4, that use of dual ported key RAM 30' allows task B to start earlier than in the prior art. In this regard, task A (i.e., loading the key) does not need to be complete before commencing task B. Furthermore, dual ported key RAM '30 allows software to load additional keys for other frames (i.e., tasks C, F, F, F) during execution of task B.

It should be appreciated that in alternative embodiments of the present invention, independent transmission (TX) and reception (RX) engines or a single shared TX/RX engine may be provided. The encryption/decryption engine, being comprised of memories and datapath, may include a common data path with multiple SBOX and key memories used for TX and RX of forthcoming packets. Another alternative includes the use multiple datapaths and SBOX/key memories for full parallel operations. In this regard it would be possible to perform a full duplex TX encryption and RX decryption at the same time. It should be further appreciated that any number of multiple instances of encryption/decryption engines may be provided on a single MAC processor (e.g., four receive engines, two transmit engines for a total of six different SBOX tables and six different key memories).

It should be understood that the improvements mentioned above in connection with decryption of data are likewise realized for encryption of data. In this regard, the MAC processor benefits from a faster RC4 cycle time and earlier start of phase 2 (i.e., not having to wait for the entire key to be loaded), so that phase 2 of the RC4 algorithm completes sooner than the prior art. Hence, transmission of encrypted data to the PHY processing device can occur at an earlier time. Also, the dual ported key RAM is capable of holding multiple keys allowing preloading of keys for forthcoming transmissions without affecting the current phase 2 operation. Consequently, key lookup and loading are also improved.

The present invention has been described with reference to a preferred embodiment. Obviously, modifications and alterations will occur to others upon a reading and understanding of this specification. It is intended that all such modifications and alterations be included insofar as they come within the scope of the appended claims or the equivalents thereof.

Having thus described the invention, it is now claimed:

1. A system for performing a decryption operation, comprising:
   a first memory for holding key values;
   a data path hardware engine coupled to the first memory;
   a second memory coupled to the data path hardware engine for storing a table;
   wherein the first memory is responsive to load a first decryption key comprising a first plurality of key values;
   wherein the data path hardware engine is configured to read the first decryption key to initialize the table in the second memory while the first decryption key is simultaneously loading into the first memory; and
   wherein the data path hardware engine is configured to initialize scrambling of the table with the first decryption key while the first decryption key is simultaneously loading into the first memory.

2. A system according to claim 1, wherein the table is an S-Box table.

3. A system according to claim 1, wherein the first memory is a dual port memory.

4. A system according to claim 1, wherein the first memory is configured to load a second decryption key before the reading of the first key value has completed, wherein the second decryption key comprises a second plurality of key values; and wherein at least one of the second plurality of key values is different than at least one of the first plurality of key values.

5. A system according to claim 4, further comprising:
   a controller coupled to the second memory;
   wherein the controller is responsive to decrypt a data packet using the scrambled table.

6. A method according to claim 5, wherein the loading of the second decryption key starts before one of the group consisting of scrambling the table and encrypting the first data packet has completed.

7. A system according to claim 1, further comprising:
   a controller coupled to the second memory;
   wherein the controller is responsive to decrypt a data packet using the scrambled table.

8. A system according to claim 7, wherein the controller is responsive to obtaining an address from a header contained within the data packet.

9. A system according to claim 8, wherein the controller is responsive to determining the address to lookup a location for the first encryption key to load into the first memory.

10. A system for performing a encryption operation, comprising:
    a first memory for holding key values;
    a data path hardware engine coupled to the first memory;
    a second memory coupled to the data path hardware engine for storing a table;
    wherein the first memory is responsive to load a first encryption key comprising a first plurality of key values;
    wherein the data path hardware engine is configured to read the first encryption key to initialize the table in the second memory while the first encryption key is simultaneously loading into the first memory; and
    wherein the data path hardware engine is configured to initialize scrambling of the table with the first encryption key while the first encryption key is simultaneously loading into the first memory.

11. A system according to claim 10, wherein the table is an S-Box table.

12. A system according to claim 10, wherein the first memory is a dual port memory.

13. A system according to claim 10, wherein the first memory is configured to load a second encryption key before the reading of the first key value has completed, wherein the second encryption key comprises a second plurality of key values, and wherein at least one of the second plurality of key values is different than at least one of the first plurality of key values.

14. A system according to claim 13, further comprising:
    a controller coupled to the second memory;
    wherein the controller is responsive to encrypt a data packet using the scrambled table.

15. A system according to claim 14, wherein the loading of the second encryption key starts before one of the group consisting of scrambling the table and encrypting the first data packet has completed.

16. A system according to claim 10, further comprising:
    a controller coupled to the second memory;
    wherein the controller is responsive to encrypt a data packet using the scrambled table.

17. A system according to claim 16, wherein the controller is responsive to obtaining an address from a header contained within the data packet.

18. A system according to claim 17, wherein the controller is responsive to determining the address to lookup a location for the first encryption key to load into the first memory.

* * * * *